US007885976B2

(12) United States Patent
Bhattacharjee et al.

(10) Patent No.: US 7,885,976 B2
(45) Date of Patent: Feb. 8, 2011

(54) IDENTIFICATION, NOTIFICATION, AND CONTROL OF DATA ACCESS QUANTITY AND PATTERNS

(75) Inventors: Bishwaranjan Bhattacharjee, Yorktown Heights, NY (US); Asit Dan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/678,167

(22) Filed: Feb. 23, 2007

(65) Prior Publication Data

US 2008/0208866 A1 Aug. 28, 2008

(51) Int. Cl.
G06F 17/30 (2006.01)
(52) U.S. Cl. ....................................... 707/787
(58) Field of Classification Search ............... 707/9; 726/26–30
See application file for complete search history.

(56) References Cited

U.S. PATENT DOCUMENTS

| | | | |
|---|---|---|---|
| 4,819,160 A | 4/1989 | Tanka et al. | |
| 5,243,652 A | 9/1993 | Teare et al. | |
| 5,696,898 A | 12/1997 | Baker et al. | |
| 6,085,191 A | 7/2000 | Fisher et al. | |
| 6,226,745 B1 | 5/2001 | Wiederhold | |
| 6,539,380 B1* | 3/2003 | Moran | 707/9 |
| 6,574,617 B1 | 6/2003 | Immerman et al. | |
| 6,606,627 B1* | 8/2003 | Guthrie et al. | 707/10 |
| 6,742,026 B1 | 5/2004 | Kraenzel et al. | |
| 6,785,721 B1 | 8/2004 | Immerman et al. | |
| 6,820,082 B1* | 11/2004 | Cook et al. | 707/754 |
| 6,845,383 B1 | 1/2005 | Kraenzel et al. | |
| 6,854,016 B1 | 2/2005 | Kraenzel et al. | |
| 6,944,184 B1 | 9/2005 | Miller et al. | |
| 7,051,039 B1 | 5/2006 | Murthy et al. | |
| 7,272,857 B1* | 9/2007 | Everhart | 726/26 |
| 2003/0084184 A1* | 5/2003 | Eggleston et al. | 709/234 |
| 2003/0101355 A1* | 5/2003 | Mattsson | 713/200 |
| 2003/0105976 A1* | 6/2003 | Copeland, III | 713/201 |
| 2004/0139043 A1* | 7/2004 | Lei et al. | 707/1 |
| 2004/0193607 A1* | 9/2004 | Kudo et al. | 707/9 |
| 2005/0165799 A1* | 7/2005 | Wong | 707/100 |

(Continued)

OTHER PUBLICATIONS

"QFilter: Fine-Grained Run-Time XML Access Control via NFA-based Query Rewriting," by Luo et al. IN: Proc. of the thirteenth ACM Int'l Conf. on Information and Knowledge Mgt., pp. 543-552 (2004). Available at: ACM.*

Primary Examiner—Neveen Abel Jalil
Assistant Examiner—Daniel Kinsaul
(74) Attorney, Agent, or Firm—Jon A. Gibbons; Fleit Gibbons Gutman Bongini & Bianco PL

(57) ABSTRACT

A device for limiting access to data in a database includes an input for receiving a request to access data in a database and a processor that is communicatively coupled to the input and allows access to the data in the database. A data counter for counting an instantaneous rate of data flow and/or a volume of data accessed and a comparator for determining if the data flow and/or the volume of data accessed in the database exceeds a previously specified value is also included, wherein the processor disallows access to the data in the database in response to the instantaneous rate and/or the volume of data exceeding the previously specified value.

20 Claims, 5 Drawing Sheets

U.S. PATENT DOCUMENTS

| | | | |
|---|---|---|---|
| 2005/0187935 A1* | 8/2005 | Kumar | 707/9 |
| 2005/0246338 A1* | 11/2005 | Bird | 707/9 |
| 2006/0248592 A1* | 11/2006 | Agrawal et al. | 726/26 |
| 2006/0259457 A1* | 11/2006 | Muras et al. | 707/2 |
| 2007/0038596 A1* | 2/2007 | Pizzo et al. | 707/2 |
| 2007/0143851 A1* | 6/2007 | Nicodemus et al. | 726/25 |
| 2007/0276835 A1* | 11/2007 | Murthy | 707/9 |

* cited by examiner

| | WHO? | WHAT DATA? | WHAT RATE? |
|---|---|---|---|
| ROW 1 | | | |
| ROW 2 | BOB BAKER | ENGINEERING PAYROLL | 500 RECORDS PER DAY |
| ROW 3 | CASSIE CONNER | CUSTOMER NAMES | 50 |

IDENTIFICATION, NOTIFICATION, AND CONTROL OF DATA ACCESS QUANTITY AND PATTERNS

FIELD OF THE INVENTION

The present invention relates generally to access control, and, in particular, to a quantitative data access control mechanism based on data sensitivity and authorization level.

BACKGROUND OF THE INVENTION

Information is a valuable asset and thus requires appropriate management and protection. Database systems play a central role because they not only allow efficient management and retrieval of large amounts of data, but also because they provide mechanisms that can be employed to ensure the integrity of the stored data. This area comes broadly under the scope of "access control."

Access control is the ability to permit or deny the use of an object (a passive entity, such as a database, table or record) by a subject (an active entity, such as a user or process). Access control systems provide the essential services of identification, authentication, authorization, and accountability, where identification and authentication determine who can log on to a system, authorization determines what an authenticated user can do (this includes what objects the user can access and what the user can do on these objects), and accountability identifies what a user did.

There have been a number of reported cases of data theft and breach of privacy in corporate and institutional data systems. These are often done by people who have authorization to access data or gain it by some means. A significant subset of these violations is insider abuse and has been described in detail in various reports in the news.

A characteristic of these types of data thefts is that a lot of data is accessed at one time. Unfortunately the current access control mechanisms do not control how much sensitive data an authorized person can access. That is, there are no quantitative access control mechanisms for different types of data. Therefore, a breach could lead to a major loss of data.

Several commercial database systems support Role Based Access Control (RBAC) or Label Based Access Control (LBAC). The central notion of RBAC is that users do not have discretionary access to enterprise objects. Instead, access permissions are associated with roles, and users are made members of appropriate roles. RBAC greatly simplifies management of authorization while providing an opportunity for system administrators to control access to enterprise objects at a level of abstraction that is close to the structure of their enterprise. All major commercial Relational Database Management System (RDBMS) (e.g. Oracle, Microsoft, Sybase, Informix, DB2) have incorporated some RBAC features and there even exists an SQL standard for roles.

LBAC allows a RDBMS to control access to database table rows based on a label contained in the row and the label associated with the user attempting the access. Each data row is given a label which stores information about the classification (or sensitivity) of the data. Similarly, each database user is given a label that determines which labeled data rows he or she can access. This model is stated in terms of objects and subjects. An object is a passive entity such as a data file, a record, or a field within a record. A subject is an active process that can request access to objects. Every object is assigned a classification, and every subject a clearance. Classifications and clearances are collectively referred to as access classes or labels. Unfortunately neither RBAC nor LBAC controls the amount of data being accessed.

There exist products, or features in products, which help in monitoring accesses and in forensic analysis of accesses after they have happened. These solutions deal with accountability. In other words, they identify who did what after it has happened rather than prevention. They also don't explicitly control how much data can be accessed at one time.

Another class of prior work falls under the category of Workload Management tools, where the primary concern is to be responsive in terms of the completion time of a user request by controlling the amount of computer resources (e.g. CPU, IO, Communication bandwidth etc) allocated to the request. However these control mechanisms are primarily concerned with resource allocation and not with controlling sensitive data.

There have been research ideas published in the area of privacy. Here, the concern is the avoidance of disclosure of information to unauthorized persons. However it does not address the issue of a person gaining access to data through impersonation, i.e., assuming the identity of authorized users. For example, the paper "Hippocratic Databases," available at http://www.vldb.org/conf/2002/S05P02.pdf, proposes one example of an access control mechanism. In this model, a query is associated with a purpose and can access any field listed for that purpose in the authorization table. This part shares similarities with RBAC. A query can return records whose purpose attributes match the query. This part shares similarities with the LBAC. Before a query result is returned, Hippocratic Databases suggests a comparison of the access pattern of this query with the usual access pattern of queries of the same purpose and user. Hippocratic Databases suggest that this check should include the number of rows accessed but it should be inferred from previous accesses by the same user. There is no mechanism to explicitly set a limit on the number of rows to be accessed. Therefore, if a user were to consistently access more data than the time before, the system would scale up with the user and eventually, a large amount of data can be accessed without flagging the system. Also, the access pattern check is on the overall results of the query. It is not linked to the number of records accessed from a table. In other words, it is at query result/purpose level and not table level. Further, they don't discuss what needs to be done when a suspicious query happens, nor do they discuss prevention mechanisms.

Therefore a need exists to overcome the problems with the prior art as discussed above.

SUMMARY OF THE INVENTION

The present invention provides a method for limiting access to data in a database. The method includes first allowing access to the data in the database, determining if an instantaneous rate of a data flow and/or a volume of data accessed in the database exceeds a previously specified value, and disallowing access to the data in the database in response to the instantaneous rate and/or the volume of data exceeding the previously specified value.

In accordance with a further feature of the present invention, the instantaneous rate is associated with at least one of a particular user and a particular data type.

In accordance with yet another feature of the present invention, a notification alert indicating that the previously specified value was exceeded is sent.

In accordance with an additional feature, the volume of data is one of a total amount of data and cumulative amount of time over a specified period of time.

In accordance with another feature of the present invention, the volume of data is measured by at least one of a number of unique rows being accessed and number of unique items being accessed.

In accordance with yet another feature, the present invention includes a device for limiting access to data in a database, where the device includes an input for receiving a request to access data in a database, a processor communicatively coupled to the input, the processor for allowing access to the data in the database, a data counter for counting an instantaneous rate of data flow and/or a volume of data accessed, and a comparator for determining if the data flow and/or the volume of data accessed in the database exceeds a previously specified value, wherein the processor disallows access to the data in the database in response to the instantaneous rate and/or the volume of data exceeding the previously specified value.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 is a table showing an example of several policies in accordance with an embodiment of the present invention.

DETAILED DESCRIPTION

Figure 1:
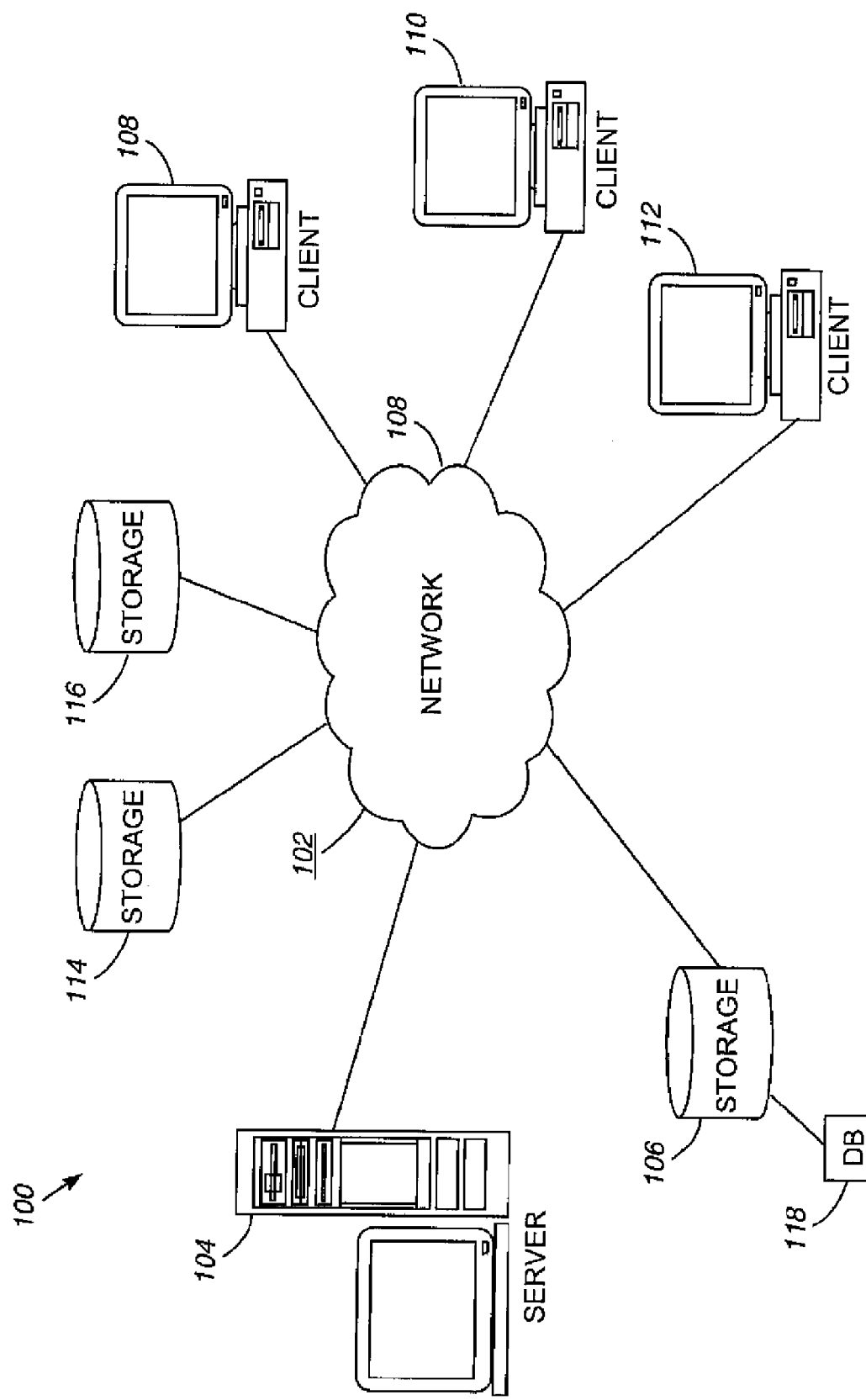
FIG. 1 illustrates a distributed data processing system in which the present invention may be implemented.

While the specification concludes with claims defining the features of the invention that are regarded as novel, it is believed that the invention will be better understood from a consideration of the following description in conjunction with the drawing figures, in which like reference numerals are carried forward.

Described now is an exemplary apparatus and method for quantitative access control based on data sensitivity and authorization level, which limits not just who can access what data, but also controls how much of a specific data type can be accessed in a given time period. Embodiments of the present invention prevent access to a large quantity of data at one time even to an authorized user and naturally to impersonators as well. The invention, according to particular embodiments, is advantageous in that it allows a data processing system in its normal data use from over exposing its data during any single session.

Network

With reference now to the figures, FIG. 1 depicts a pictorial representation of a network of data processing systems in which the present invention may be implemented. Network data processing system 100 contains a network 102, which is the medium used to provide communications links between various devices and computers connected together within network data processing system 100. The network 102 may include wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, a server 104 is connected to network 102 along with storage units 106, 114, and 116. Alternatively, storage 106 may be coupled directly to server 104 with storage unit 114 coupled to client 108, for example, with storage unit 116 coupled to client 110. A storage unit may, alternatively, be directly connected to server 104 with network 102 connected to clients 108, 110 and 112 in a Network File System (NFS) configuration. Finally, server 104 and clients 108, 110, and 112 could all be directly connected to the same storage units 106, 114, and 116 in a Storage Area Network (SAN) configuration.

In addition, clients 108, 110, and 112 also are connected to network 102. These clients 108, 110, and 112 may be, for example, personal computers or network computers. In the depicted example, clients 108, 110, and 112 are clients to server 104 and server 104 provides data, such as boot files, operating system images, and applications to clients 108, 110, and 112. Clients 108, 110, and 112 can each be executing the same or a different operating system.

Network data processing system 100 may include additional servers, clients, and other devices not shown. In the depicted example, network data processing system 100 includes the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Server

Figure 2:
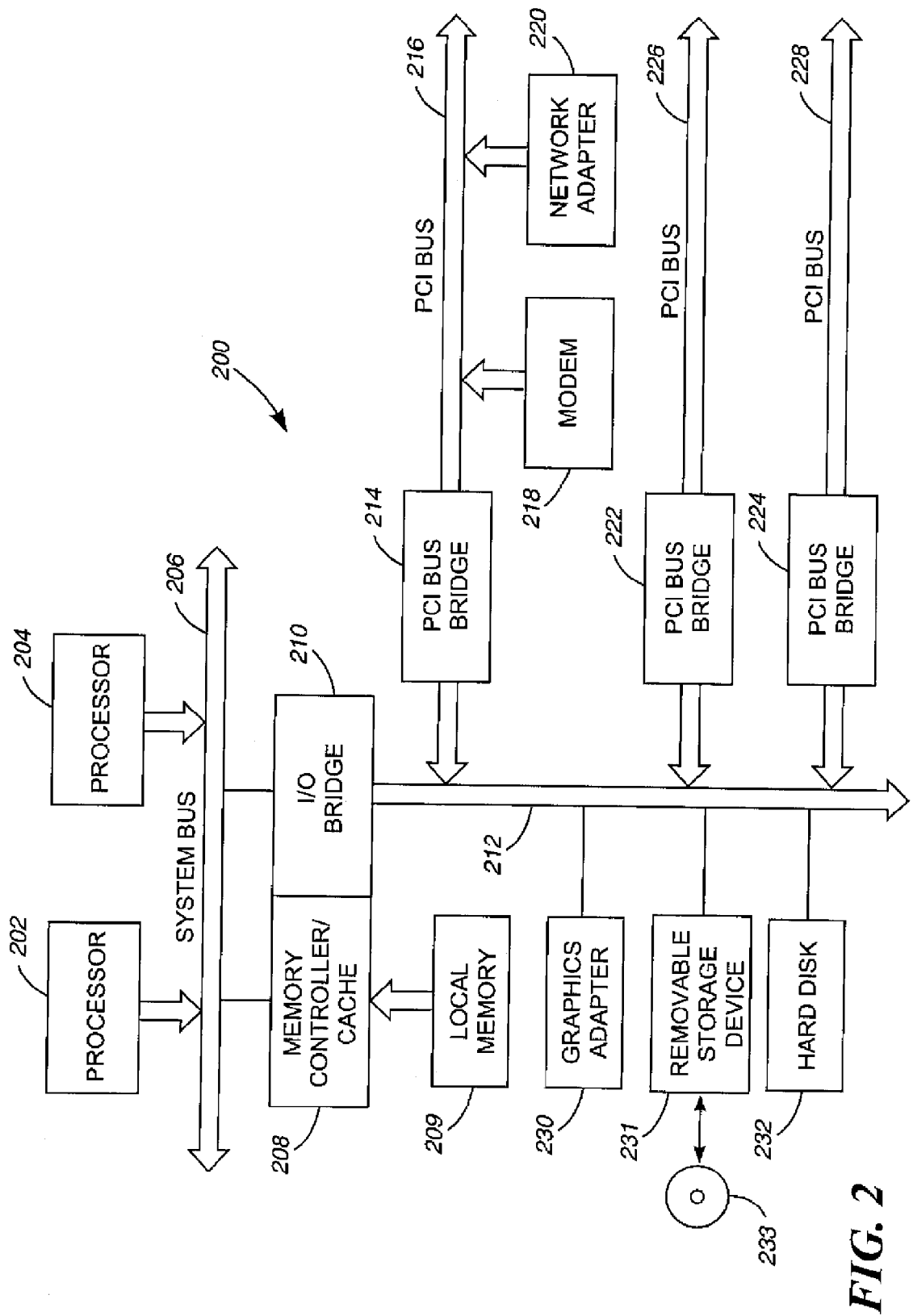
FIG. 2 is a block diagram of a data processing system that may be implemented as a server computer system, such as server 104 shown in FIG. 1 in accordance with an embodiment of the present invention.

Referring to FIG. 2, a block diagram of a data processing system that may be implemented as a server, such as server 104 in FIG. 1, is depicted in accordance with one embodiment of the present invention. Data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. The processor 202 or 204 in conjunction with memory controller 208 controls what data is stored in memory 209. The processor 202 and/or 204 and memory controller 208 can serve as a data counter for counting the rate of data flow to the memory 209 or from the memory 209 and can also count the total volume of data accessed to or from the memory 209. The processor 202 or 204 can also work in conjunction with any other memory device or storage locations, such as storage areas 106, 114, and 116, to serve as a data counter for counting data being accessed on the data storage areas.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 110, and 112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

In this document, the terms "computer program medium," "computer usable medium," and "computer readable medium" are used to generally refer to media such as main memory 209, removable storage drive 231, removable media 233, hard disk 232, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in memory. Computer programs may also be received via communications interface 216. Such computer programs, when executed, enable the computer system to perform the features of the present invention as discussed herein. In particular, the computer programs, when executed, enable the processor 202 and/or 204 to perform the features of the computer system. Accordingly, such computer programs represent controllers of the computer system.

Client Device

Figure 3:
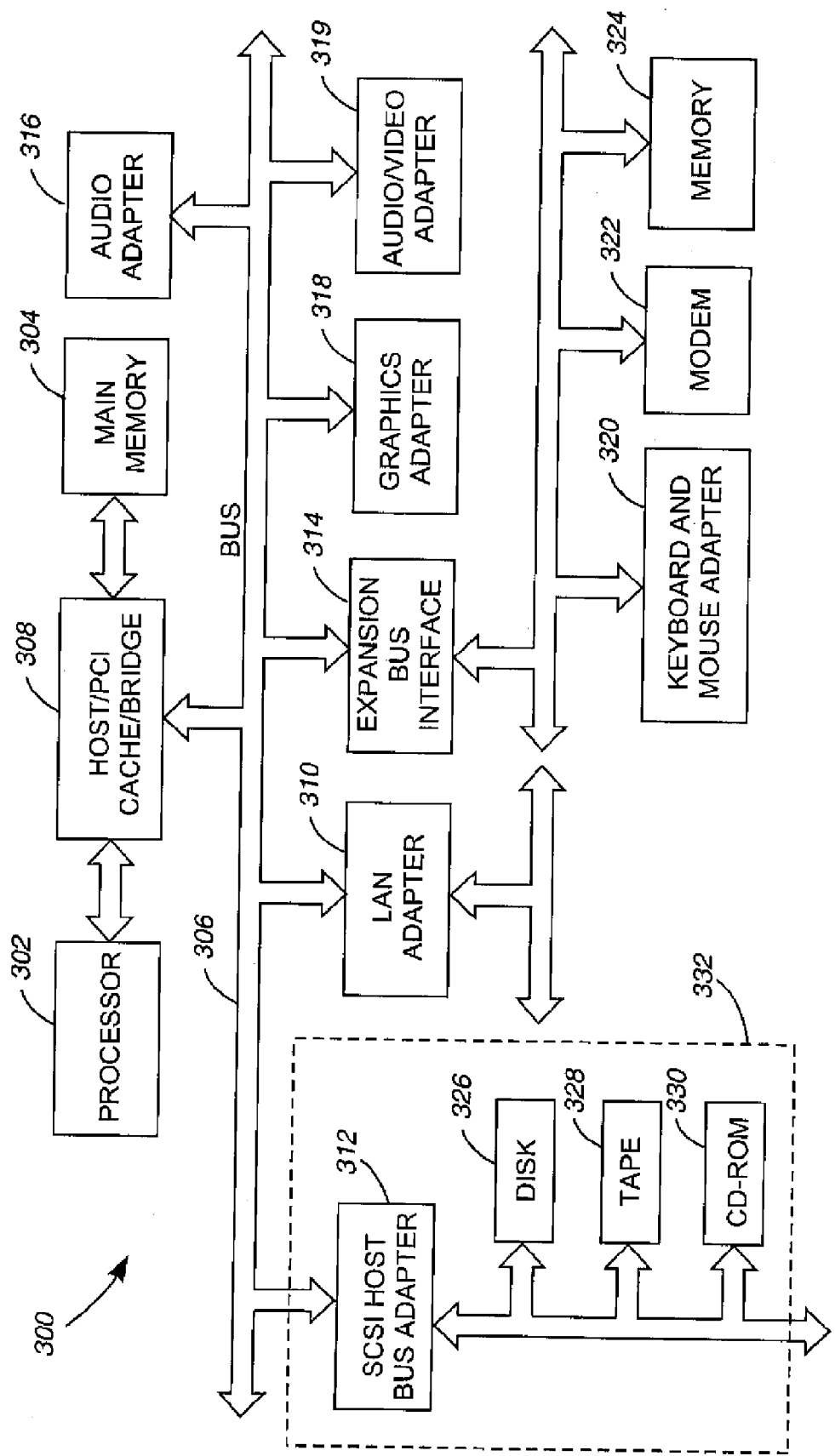
FIG. 3 a block diagram of a data processing system that may be implemented as a client computer system, such as one of the clients 108, 110, or 112 shown in FIG. 1 in accordance with an embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. Each client is able to execute a different operating system. The operating system may be a commercially available operating system, such as Windows XP, which is available from Microsoft Corporation. A database program such as Oracle may run in conjunction with the operating system and provide calls to the operating system from Java programs or applications executing on data processing system 300. "Oracle" is a trademark of Oracle, Inc. and "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Access Policy

The above described hardware is useful for implementing the present invention which allows owners of data to define and maintain control on not just who can access what types of data, but also control instantaneous rates and/or cumulative volumes of data accessed. This control ensures normal operation and data access only to trusted users, while barring anyone accessing too much of a defined data type. The invention is particularly useful in cases where data access credentials fall on the wrong hand or a trusted employee/insider begins abusing that privilege.

FIG. 4 illustrates one embodiment of a policy structure 400 for expressing control of the rate a user is able to access sensitive data. The structure, in this embodiment, includes three parts, although other fields can be included. This structure can reside in memory or on any computer readable memory that is accessible to the server or other database access control mechanism. The first field 402 defines who can access specific types of data; the second field 404 specifically defines what data is accessible to that user; and the third field 406 defines a maximum rate to which that data is accessible to the specified user(s). This policy structure can be referenced by whatever entity is the gatekeeper to the data on the database being accessed. In some situations, multiple databases and multiple types of data are accessible to a particular user. The present invention is not limited to any number of databases or types of data.

Who can access data and what types of data can be accessed is known and is not explained in detail here other than to say that these details can be specified in any known or future method of expression, such as an enumerated list or list expression. This can include expression of group identity (e.g., where "<user> isPartof"groupName"), any enumerated list (e.g., "user1", "user2", . . . ), or any other list expression typically used in access control. Additionally, what data can be accessed can be specified by any data query language for selecting data, such as Standard Query Language or SQL. SQL is well suited for identifying relational data stored in table format. However, other appropriate query language can be used for non-relational data.

The rate for accessing the data by the specific users can be specified by any access rate expression. Note that this rate can be either instantaneous or cumulative. An expression of an instantaneous data access rate can include an amount of data and a time period over which the specified data amount rate can be accessed. The data amount can be expressed in various forms including physical amount such as the number of bytes accessed, or logical amount such as the number of unique rows in the table to be accessed. A time period can be expressed by any expression of time duration, such as number of hours, minutes, etc. and may also include an additional qualifying expression of time period, such as prime time, week days, evenings, etc. One example of an access rate expression could be to allow accessing "during prime time 10 rows per hour", with "prime time" being a period of time known by the system.

A cumulative amount of data can also be specified in the policy 400. A cumulative amount specifies the maximum volume of data that can be accessed by a user or group of users. The maximum amount can be a total amount that a single user is allowed to access for all time or can have associated with it a time frame, such as per hour, per day, etc. With a cumulative limit, the user's access to data is tracked, recorded, and subtracted from the user's remaining data access amount at the beginning of future sessions that are within the specified time limit, if one exists.

As an example of policies in accordance with embodiments of the present invention, the second and third rows of the table of FIG. 4 have populated fields. Row two specifies Bob Baker as the person allowed to access the data; "engineering payroll" as the data he is allowed to access; and "500 records per day" as the rate. The third row specifies Cassie Conner as the person allowed to access the data; "customer names" as the data she is allowed to access; and 50 as the total volume of data she is allowed to access. As should be obvious, any data records and any data access rate can be specified and will work with embodiments of the present invention.

The present invention can also limit user access to records through use of rules. Examples of such rules could be "a user may not access more than X unique rows in table Y or X GB of physical data transfer during an hour". The invention can also have different rates for different time durations, i.e., a rate for hour, and a different cumulative rate for an entire day, week, and more.

In another embodiment, the invention can also have different rates for instantaneous and cumulative time periods over different time durations, i.e., a rate for hour, and a different cumulative rate for an entire day, week, and more. Further the rate might be different for different weeks of the month. For example a payroll person might require access to a larger volume of data during payroll periods but not necessarily the same quantity of data access for the other parts of the month (or quarter).

Enforcing Policies

Policies defined in policy structures, such as policy structure 400, can be enforced, for example, at the query compilation level or runtime control of physical data transfer. Any attempt to access more data than allowed by policy setting will result in not only limiting data transfer, but also notifying the administrator and/or denying further access to the database.

For example, in one embodiment of the present invention, when a user submits a new query, a query rewriter accesses a table that defines the rights of the user and uses the allowed number of rows to rewrite the SQL query with an embedded Fetch First n Rows Only (FFnRO) clause. The FFnRO clause is used to limit the number of rows returned by a query to a maximum of n rows if the total output is greater than n rows. In the event the actual number of rows returned is less than or equal to n rows, then only that many are returned. The query rewriter would also access a set of optimizer data access statistics for the query and if it exceeds the bounds for the user, notify a system administrator about this fact. In case a cumulative upper bound for the number of rows being accessed for a user is specified, it will store the number of unique rows actually accessed in a table and use that to add to future access numbers to implement data control i.e., it will check policy rules and number of previously accessed rows prior to invocation of new access allowance. In another embodiment, runtime monitoring of the amount of data that the query is accessing can be performed and limits can be enforced by instantly curtailing the amount of data or rows being accessed.

In still another embodiment, post analysis can be performed on the access log for data or rows being accessed.

Figure 5:
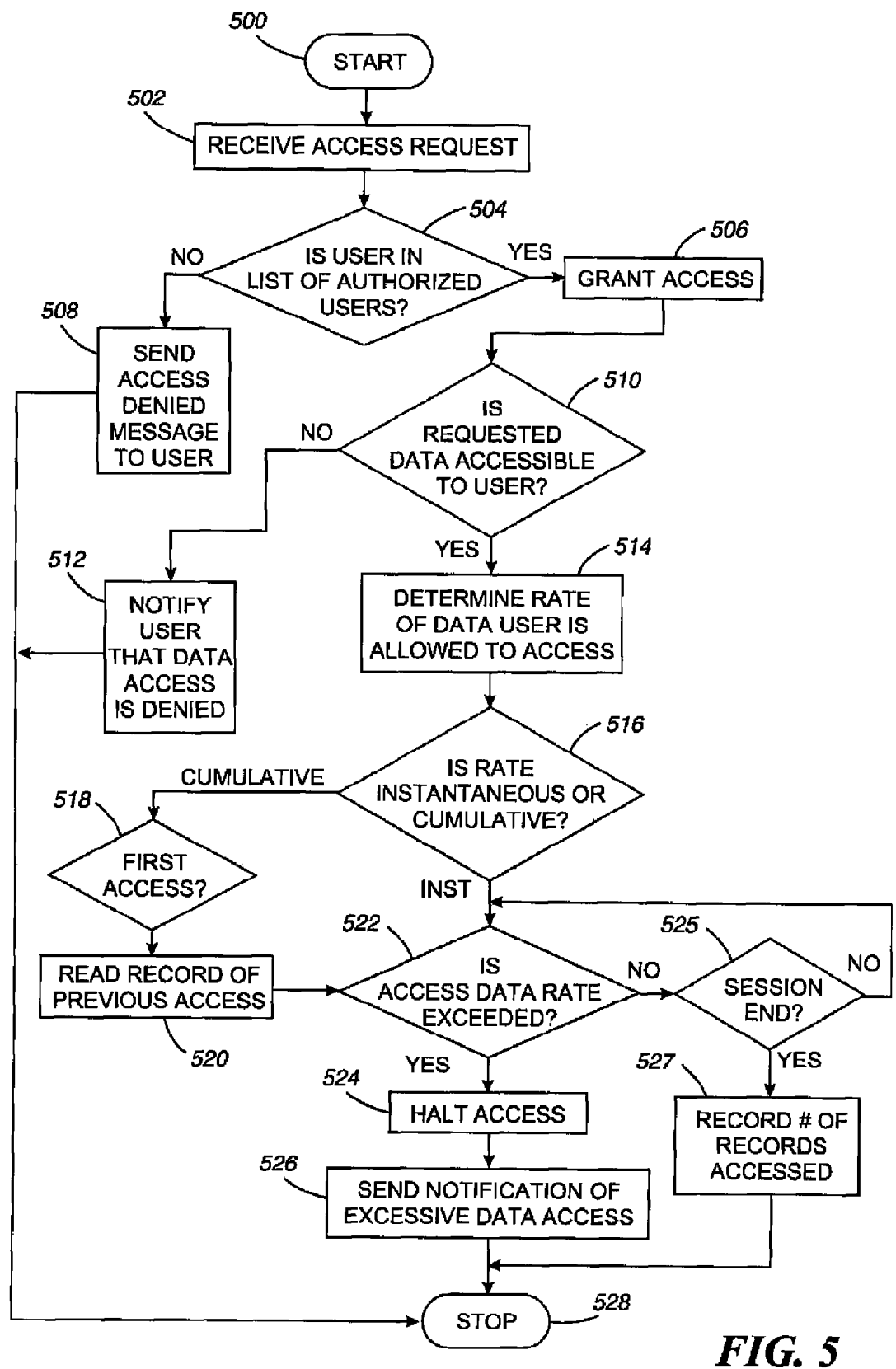
FIG. 5 is a process flow diagram of automated data quantity access control in accordance with an embodiment of the present invention.

FIG. 5 shows a process flow diagram of policy enforcement according to embodiments of the present invention. The flow begins at step 500 and moves directly to step 502, where an access request is received from a user. The request includes a user's identification. In step 504, the user's identification is compared to a list of authorized users. The list can be similar to table 400 shown in FIG. 4. If the received identification is present in the list, access is granted in step 506. If the identification is not in the list, the flow is sent to step 508 where a message is sent to the user that access is blocked. The flow then moves to step 528 where the flow stops.

If the user is determined to be an authorized user, the next step is to determine what data the authorized user is allowed to access; this information can be predefined and reside in a table in memory, such as table 400, or can be queried from a system administrator or other source. In one embodiment, the data requested by the user is included in a request to the system and, in step 510, the system compares the request to a record of available data to which the user is allowed access. If the system determines that the user is not allowed access to any data or the request includes a request to access data that is not available or not authorized for that particular user, the flow moves to step 512 where a message is sent to the user indicating that access to the requested data is not granted or that the requested data is unavailable. The flow then stops at step 528.

Provided the user identified in the request is authorized and the request is for data that the user is granted access to, the flow moves to step 514 where the rate of data the user is allowed to access is determined. Again, this data can reside in a table similar to table 400 shown in FIG. 4 and can be located by cross-referencing the user identifier. In step 516, a determination is made whether the data rate is an instantaneous rate, meaning a rate per amount of time for a single session, e.g. 10 records per minute, or whether the data rate is a cumulative rate, i.e., includes records accessed in previous sessions. This specified rate and the monitoring can include data written, data read, and data deleted.

If the data rate is a cumulative rate, the system will determine, in step 518, if the rate is presently being initiated or if it is a continuing accumulation, i.e., have records been accessed before that are part of the continuing count of records? For example, if the access rate 406 is defined as "100 records per day," each time the user accesses the data, the number of records accessed should be stored in memory (main memory or secondary persistent storage or other medium) so that when the user accesses more records in the same day, he is only allowed access to 100 minus the number of records already accessed that day. Therefore, if the access rate is an accumulating rate rather than an instantaneous rate, and the access is not the first access in the time range, the flow moves to step 520, where a record storing the number of previously accessed records in the time range is read. The flow moves to step 522 where the amount of records being access begins monitored. Alternatively, if in step 516, the rate is determined to be instantaneous, the flow moves directly to step 522 where the amount of data being access is monitored. In step 522, the processor 202 or 204 performs a comparator function to continuously compare the data access rate or volume of data being accessed to the limit specified in the policy 400. The data being measured can be on a bit-by-bit basis, word-by-word, record-by-record, or any other quantity of data that is advantageous for the situation.

A continuous check is performed in step 522 to determine whether the allowed number of records is being exceeded. At the end of each iteration, or at certain intervals, if the data rate has not been exceeded, a check is made in step 525 to determine whether the user has terminated the session. If the user has terminated the session, the flow moves to step 527 where the number of records accessed is stored in memory. This number can be used later if cumulative monitoring is again selected. The flow then moves to step 528 where the process ends. Alternatively, if the user has not terminated the session in step 525, the flow moves back to step 522 where another check is performed to determine whether or not the data rate is exceeded for this session.

If the data rate 406 is exceeded, access to the database is halted in step 524. In step 526, a message is sent via one of the server outputs 216, 226, or 228, to the user and also, in one embodiment, to the system administrator of the access denial due to excessive data access. Notifications could be generated when a request is denied or a request is preempted in anticipation of violations or at a later stage. These notifications could be via email or by raising a database event or by logging the activity in an event log. The flow then stops at step 528.

The present invention, as has just been described, is advantageous in that it fills a gap in currently-known access control mechanisms by providing controls on the amount of data which can be accessed by an authorized user based on a policy for current access or the pattern of previous access by the user. Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for limiting access to data in a database, the method comprising:
   receiving at least one new query for data from at least one user;
   rewriting the at least one new query to form a rewritten query including a Fetch First n Rows Only (FFnRO) clause with a value n representing a number of rows to be returned from the rewritten query against data in the database
   running the rewritten query against the data to return only results located in the number of rows specified by at least one of
      a maximum instantaneous rate of a data flow, the value n set is based on one or more access rights associated with the user when accessing data in the database, and
      a maximum cumulative volume of data associated with the user when accessing data in the database, the value of n is based on one or more access rights associated with the user, and a maximum cumulative volume value less any number of row previously fetched over a specified period of time.

2. The method according to claim 1, wherein the instantaneous rate is associated with a particular data type.

3. The method according to claim 1, further comprising:
   sending a notification alert indicating that the specified value was exceeded.

4. The method according to claim 1, wherein the maximum volume of data is one of a total amount of data and cumulative amount of time over a specified period of time.

5. The method according to claim 4, wherein the cumulative amount of time is measured over different time periods.

6. The method according to claim 4, wherein the maximum volume of data is measured by at least one of a number of unique rows being accessed and number of unique items being accessed.

7. The method according to claim 1, wherein the specified value of at least one of the instantaneous rate of data flow and the volume of data accessed varies over time.

8. The method according to claim 1, wherein the instantaneous rate is one of a bit rate and a rate of accessing records.

9. The method according to claim 8, wherein the instantaneous rate is measured over different time periods.

10. The method according to claim 1, wherein the method is performed at query compilation level which is inside the database.

11. The method according to claim 1, further comprising:
    sending a notification alert indicating that the-specified value is approaching.

12. A computer program product for limiting access to data in a database, the computer program product comprising:

a storage medium readable by a processing circuit and storing instructions for execution by the processing circuit for performing a method comprising:

receiving at least one new query for data from at least one user;

rewriting the at least one new query to form a rewritten query including a Fetch First n Rows Only (FFnRO) clause with a value n representing a number of rows to be returned from the rewritten query against data in the database running the rewritten query against the data to return only results located in the number of rows specified by at least one of a maximum instantaneous rate of a data flow, the value n set is based on one or more access rights associated with the user when accessing data in the database, and a maximum cumulative volume of data associated with the user when accessing data in the database, the value of n is based on one or more access rights associated with the user, and a maximum cumulative volume value less any number of row previously fetched over a specified period of time.

13. The computer program product according to claim 12, further comprising:

sending a notification alert indicating that the specified value was exceeded.

14. The computer program product according to claim 12, wherein the maximum volume of data is one of a total amount of data and cumulative over a specified period of time.

15. The computer program product according to claim 12, wherein the specified value of at least one of the instantaneous rate of data flow and the volume of data accessed is time dependent.

16. The computer program product according to claim 12, wherein the instantaneous rate is one of a rate of accessing raw data and a rate of accessing records.

17. An information processing system for limiting access to data in a database, the information processing system comprising:

a memory; and a processor, wherein the processor is configured to perform a method comprising:

receiving at least one new query for data from at least one user;

rewriting the at least one new query to form a rewritten query including a Fetch First n Rows Only (FFnRO) clause with a value n representing a number of rows to be returned from the rewritten query against data in the database running the rewritten query against the data to return only results located in the number of rows specified by at least one of a maximum instantaneous rate of a data flow, the value n set is based on one or more access rights associated with the user when accessing data in the database, and a maximum cumulative volume of data associated with the user when accessing data in the database, the value of n is based on one or more access rights associated with the user, and a maximum cumulative volume value less any number of row previously fetched over a specified period of time.

18. The system according to claim 17, wherein the method further comprises:

determining if the user is an authorized user based on a policy associated with the data requested from the query;

determining, in response to the user being an authorized user, that at least one of an instantaneous rate of a data flow and a volume of data accessed by the query in the database exceeds a specified value in the at least one query that has been rewritten; and disallowing access to the data in the database in response to the at least one of an instantaneous rate and a volume of data exceeding the specified value.

19. The system according to claim 18, wherein the method further comprises:

sending a notification alert indicating that the-specified value is approaching.

20. The system according to claim 18, wherein the determining if the user is the authorized user based on the policy associated with the data requested from the query includes a policy containing at least three parts consisting of an identification of who can access the data;

an identification of data that can be accessed; and a maximum rate to which the data is accessible.

\* \* \* \* \*